United States Patent
Young et al.

(10) Patent No.: US 8,384,716 B2
(45) Date of Patent: Feb. 26, 2013

(54) IMAGE PROCESSING METHOD

(75) Inventors: Philippe Georges Young, Lympstone (GB); Viet Bui-Xuan, Exeter (GB)

(73) Assignee: Simpleware Limited, Devon (GB)

(*) Notice: Subject to any disclaimer, the term of this patent is extended or adjusted under 35 U.S.C. 154(b) by 901 days.

(21) Appl. No.: 12/471,208

(22) Filed: May 22, 2009

(65) Prior Publication Data
US 2009/0295803 A1 Dec. 3, 2009

(30) Foreign Application Priority Data

May 27, 2008 (GB) ................... 0809588.7

(51) Int. Cl.
*G06T 17/20* (2006.01)
*G06T 17/00* (2006.01)
(52) U.S. Cl. ....................... 345/423; 345/424
(58) Field of Classification Search ........... 345/423–424
See application file for complete search history.

(56) References Cited

U.S. PATENT DOCUMENTS

| | | | |
|---|---|---|---|
| 4,710,876 A | 12/1987 | Cline | |
| 6,775,401 B2 | 8/2004 | Hwang | |
| 7,010,164 B2* | 3/2006 | Weese et al. | 382/173 |
| 2002/0122038 A1* | 9/2002 | Cowperthwaite | 345/428 |
| 2005/0055035 A1* | 3/2005 | Cosman et al. | 606/130 |
| 2006/0017749 A1* | 1/2006 | McIntyre et al. | 345/664 |
| 2010/0226589 A1* | 9/2010 | Mukherjee | 382/264 |

FOREIGN PATENT DOCUMENTS

| | | |
|---|---|---|
| WO | WO 02/073536 | 9/2002 |
| WO | WO 2004/047030 | 6/2004 |

OTHER PUBLICATIONS

Carpendale et al. "A Framework for Unifying Presentation Space", UIST'01 ACM p. 61-70, Nov. 2001.*

Chen et al. "Construction of an objective function for optimization-based smoothing", Engineering with Computers, 20: p. 184-192, 2004.*

Keyak J.H. et al., Automated three-dimensional finite element modeling of bone: a new method, J Biomed Eng 12(5): 389-397 (Sep. 1990).

Müller R. et al., Three-dimensional finite element modeling of noninvasively assessed trabecular bone structures, Med Eng Phys, 17(2): 126-133(Mar. 1995).

Balmell, Laurent et al., Volume warping for adaptive isosurface extraction, From IEEE Visualization 2002, Boston, USA (Oct. 2002).

* cited by examiner

*Primary Examiner* — Tize Ma
*Assistant Examiner* — Yingchun He
(74) *Attorney, Agent, or Firm* — Leason Ellis LLP

(57) ABSTRACT

A modified VOMAC mesh generation method for image data sampled from an actual object in which mesh resolution can vary locally within the mesh while permitting control of the distortion of cells in the mesh to maintain suitability for performing finite element (or finite volume) analysis on a representation of the object.

The method includes computer-implemented instructions that calculate a variable sampling point distribution (SPD) in image data space, the variable SPD having localized variations in SPD within the image data space, and the distribution of sampling points having the same topology as a uniform SPD suitable for obtaining a regular structured is mesh. The method includes generating an indication of the magnitude of cell distortion between the generated mesh and the regular structured mesh Varying the mesh resolution may enable smaller elements to be located in regions of particular interest or activity when subsequently performing analysis using the mesh model.

22 Claims, 3 Drawing Sheets

IMAGE PROCESSING METHOD

This patent application claims the benefit of priority under 35 U.S.C. Section 119(e) from Great Britain Patent Application No. 0809588.7, filed on May 27, 2008, now pending and entitled "Image Processing Method," which is hereby incorporated by reference in its entirety.

FIELD OF THE INVENTION

The invention relates to the generation of a meshed model from 2D or 3D image data, in which the model is suitable for use with finite element or finite volume simulation software.

BACKGROUND TO THE INVENTION

It is often desirable to generate models appropriate for carrying out physics-based simulations from image data. For example, a user may want to explore the temperature field generated by a cellular telephone around a human head. A model for the head may be generated from image data obtained from different medical imaging modalities e.g. Magnetic Resonance Imaging (MRI) scans. The most commonly used techniques for physics-based simulations, the finite element and finite volume approaches, require the generation of a mesh of one or more identified volumes of interest (VOI) within the image. The mesh consists of a discretization of these VOIs into a number of primitive entities known as finite elements or cells. For a 3D mesh, the entities are primitive solid volumes. Tetrahedra and/or hexahedra are commonly used. They are arranged to represent approximately both the geometry of the structure and are also used to model variations of some field parameter (e.g. flux) in a piecewise manner. In the example above, meshes for VOIs corresponding to the skull, brain, etc. may be desired.

A known approach to generating meshed models (i.e. models suitable for physics-based finite volume simulations) from image data is to "reverse engineer" the image data into an appropriate geometric computer representation of the bounding surfaces of the VOIs, e.g. a computer-aided design (CAD) model for use in engineering software packages such as AutoCAD and CATIA. To arrive at the CAD model, the image data is first segmented to identify one or more volumes of interest. The segmenting process can be achieved using commercially known image processing tools, e.g. Analyze, 3D Doctor, ScanIP. The boundaries between adjacent VOIs and VOIs and background data are then constructed. This surface extraction or reconstruction can be achieved using a number of approaches the most popular being the marching cubes technique disclosed in U.S. Pat. No. 4,710,876 or variants thereof. The generated surface descriptions can then be exported in an appropriate format to be read by CAD packages (STL, SAT, IGES).

These CAD models can then be used as the basis for generating meshes using any of a number of conventional meshing algorithms (e.g. advancing front, Delaunay meshing, etc.). Because traditionally physics-based simulation has almost entirely been applied to models generated from CAD packages, there is a wide range of commercial and shareware software packages for meshing from CAD models, e.g. HyperMesh from Altair Engineering, Inc., ANSYS ICEM CFD from ANSYS, Inc., Abaqus from Dassault Systèmes, etc.

The above described mesh generation technique thus comprises three steps: (i) segment image data into volumes of interest (VOI), (ii) generate CAD model, and (iii) mesh CAD model.

More recently, mesh generation techniques for image-based models that bypass the generation of a CAD model have been gaining favor. These techniques exploit the fact that the image data obtained from many imaging modalities can often be treated as a mesh of the scanned volume.

A robust and direct approach to meshing based on this implicit mesh was first proposed by Keyak—Keyak J. H., Meagher J. M., Skinner H. B., Mote C. D., Jr.: *Automated three-dimensional finite element modelling of bone: A new method. J Biomed Eng* 12(5): 389-397, September 1990. In this method, the image data obtained from 3D volume imaging modalities is segmented into VOIs and those sample points within the VOIs are considered as the centre points of hexahedral elements. The mesh then consists of a plurality of regular identical eight-node hexahedra which represent the VOI. This method is often referred to as the "voxel method" where a voxel (volume element) is the three dimensional equivalent of a pixel (picture element).

The voxel method is straightforward to implement and is very robust but suffers from two principal drawbacks. Firstly it generates stepped model surfaces; indeed, the resulting finite element models in 3D have a block-like appearance which is both visually unappealing and can, in many instances, prejudice subsequent analysis. Secondly, in this method the element sizes are constant throughout the volume of interest, and defined by the original image data sampling rate.

The first drawback (stepped model surfaces) was addressed by the volumetric marching cubes (VOMAC) approach developed by Müller—Müller, R. and Rüegsegger, P.: *Three-dimensional finite element modelling of non-invasively assessed trabecular bone structures. Med Eng Phys*, 17(2): 126-133, March 1995. This is effectively an extension of the marching cubes image processing technique disclosed in U.S. Pat. No. 4,710,876 which allows for reconstruction of smooth surfaces from image data. The VOMAC approach effectively marries the marching cubes approach with the voxel approach. It differs from the voxel approach in considering sampling points not as the centre of hexahedra but as the vertices (nodes) of the hexahedral grid. On the boundaries of the VOI where hexahedra have vertices which are both in and out of the VOI then the hexahedra is carved into a set number of tetrahedra creating a smooth surface reconstruction of the surface of the VOI following the Marching Cube scheme.

The VOMAC approach has been further developed and enhanced to deal with several volumes of interests meeting at a point, i.e. three or more part intersections, and is available commercially, e.g. as the +ScanFE module from Simpleware Limited. However, the VOMAC approach suffers from the same second drawback as the original voxel approach: it generates a mesh of relatively uniform element density throughout the VOI. With VOMAC the mesh consists of mixed hexahedra and tetrahedra (or all tetrahedra) as opposed to the all hexahedral mesh generated by the voxel approach.

SUMMARY OF THE INVENTION

The present invention is concerned with improving the VOMAC/voxel approach by addressing the second drawback discussed above. In the known VOMAC/voxel approach, mesh resolution may be changed by either artificially (numerically) down-sampling, or alternatively super-sampling, the original image data before conversion to a mesh. The resolution for the whole model is determined by the highest sampling density required properly to capture features of interest in the image data space. A model generated in this way may not be efficient to process because it may be more finely meshed than required in some areas, i.e. not all portions of the mesh need to have the same density of cells. Moreover, this approach may render the problem computationally intractable because of the large number of cells. In other words, the number of cells may be very large because the need for localized high sampling density necessitates a globally high sampling density.

At its most general, the invention provides a modification of the VOMAC mesh generation method for image data in which the mesh resolution can vary locally within the mesh whilst permitting control of the distortion of cells in the mesh to maintain suitability for performing finite element (or finite volume) analysis. Varying the mesh resolution may enable smaller elements to be located in regions of particular interest or activity when subsequently performing finite element (or finite volume) analysis using the mesh model. Such mesh refinement may be particularly advantageous in finite element and finite volume analyses in order to better approximate the response of the system in certain critical areas. For example, in a simulation of hitting a skull with a hammer on the forehead a fine mesh around the impact site is desirable to capture the high stress gradients at the point of impact accurately. Varying the mesh resolution may allow areas of relatively high geometric complexity to be captured without also increasing cell density in areas of lesser interest, where it may not be required. Moreover, in images where the properties of material being imaged is captured in the image data, the invention may permit variance of the mesh resolution to provide greater cell density for regions in which the properties vary substantially.

There are two principal advantages of a locally denser mesh: (a) it can capture locally more complex geometry, e.g. to improve geometric accuracy/fidelity, and (b) it can model better variations in field parameter in a subset of the mesh domain, either because this field parameter varies rapidly and hence many elements are required to accurately approximate/model it in that area or because there is a point of particular interest to the analyst who wishes more accurate results from his model in a particular portion of the model.

Expressed generally, the invention provides an indication of the magnitude of cell distortion associated with a variation in mesh resolution that is achieved by creating a distribution of sampling points for sampling the image data space to generate a mesh comprising a network of adjoining cells, wherein the distribution has variations in sampling point density within the image data space yet has the same topology as a uniform sampling point distribution for a regular structured mesh. The generated mesh may thus be seen as a morphed version of the regular structured mesh that is created by a non-uniform (e.g. variable) sampling of the image data. By applying the topology of a (e.g. hypothetical) regular sampling point distribution to a non-uniform distribution of actual sampling points, the actual sampling points may be treated as if they yield a regular structured mesh for the purposes of applying the VOMAC algorithm.

For example, the actual sampling points (corresponding to the varying distribution) may be mapped from a (e.g. hypothetical) regular sampling point distribution using a morphing function. In generating the mesh, the actual sampling points may be treated as if they lie on the regular sampling point distribution to generate a regular structured mesh which is subjected to processing techniques suitable for such structured meshes, e.g. VOMAC or the like. The mesh produced by that processing may then be transformed to a final (morphed) mesh by applying the morphing function thereto. This is enabled by matching the topology of a variable sampling point distribution with the topology of a regular sampling point distribution.

According to one aspect of the invention there is provided a computer-implemented method of generating from image data of an actual object a meshed model of the object suitable for finite element analysis or finite volume analysis, the method comprising: calculating a distribution of sampling points for sampling the image data space, the distribution having localized variations in sampling point density within the image data space; sampling the image data at the sampling points; and generating a mesh of adjoining cells from the sampled image data, wherein the distribution of sampling points has the same topology as a uniform sampling point distribution suitable for obtaining a regular structured mesh, and the method includes generating an indication of the magnitude of cell distortion between the generated mesh and the regular structured mesh.

The calculating, sampling, and generating steps are implemented using respective code executing in a processor of the computer that implements the method.

The method can further have the generated mesh, or a model based on the generated mesh, displayed on a display.

The regular structured mesh may be a uniform network of cells (e.g. based on orthogonal Cartesian coordinates), in which the same number and configuration of cells meet at each node (junction at the vertices of adjoining cells). In 3D the regular structured mesh may be based on a Cartesian coordinate system, or on a spherical or cylindrical coordinate system.

Calculating the distribution having localized variations in sampling point density (hereinafter "the variable distribution") may include determining a morphing function which maps a regular sampling distribution on to the variable distribution. Generating the mesh may include generating an intermediate regular structured mesh using the data obtained from the variable distribution but as if the sampling points of that distribution were a uniform sampling distribution. Although this intermediate mesh is not an accurate representation of the image data, it may have the correct format for applying techniques such as VOMAC. For example, known implementations of VOMAC, e.g. involving look up tables for determining how to break up a hexahedra into different tetrahedra on a bounding surface, may remain valid. Following these refinement processes, the intermediate mesh may be transformed to the final (generated) mesh by applying the morphing function e.g. to nodal coordinates of the refined intermediate mesh. The final mesh is a true representation of the variable distribution of sampling points. This technique obviates the need to adapt conventional mesh refinement techniques to match the variable distribution.

The morphing function may be a scaling function for mapping each sampling point in a regular sampling point distribution into a point in the variable distribution. The method may include determining a sampling point density for the regular sampling point distribution. Since the method may involve morphing the regular distribution, no new sampling points may be added. The maximum cell density for a given level of distortion may therefore be limited by the sampling point density of the (hypothetical) regular sampling point distribution.

The scaling function may be determined based on information about the image data, e.g. based on constraints or boundary conditions input by a user. The constraints may include limiting the magnitude of distortion, or specifying the size of a distorted region, or specifying the sampling point density in an area of interest.

By retaining the topology (e.g. the same number and general configuration of cells) between the variable distribution and the regular distribution, the technique disclosed herein differs from decimation algorithms, which can be applied a posteriori to high resolution mesh models generated by the voxel approach e.g. to reduce resolution in certain areas by, for example, agglomerating cells. Such decimation techniques have limitations, for example because they do not preserve the structured architecture (the number of cells which meet at a node) of the mesh. By retaining the number and general configuration of the cells, the mesh generated using the present technique may be processed using conventional techniques e.g. to generate a smooth mesh of the boundary or edges of a region of interest using the VOMAC approach. Thus, in one embodiment there may be two or more adjoining regions of interest, one or both of which may contain morphed cells. In this embodiment, the method may include performing marching cubes or volumetric marching cubes processing to refine e.g. smooth the interface between the regions of interest. The invention is particularly advantageous because the VOMAC approach can be applied without modification.

The method may be applicable to two dimensional (2D) or three dimensional (3D) image data. Images of surfaces or objects respectively can be obtained using a wide range of 2D and 3D imaging modalities including, for 2D, photographic images (both digital and traditional film based), X-Ray, 2D ultrasound, Scanning Electron Micrographs and, for 3D, Magnetic Resonance Imaging (MRI), Computed Tomography (CT), Ultrasound, micro-CT, and serial sectioning followed by 2D imaging. The image data may thus be information generated by any of the above. The imaging modalities listed above are examples of obtaining data through sampling at prescribed points in space. This is distinct from imaging modalities in which data is obtained from surface probes, e.g. Coordinate Measurement Machines. The principal difference is that in the case of the former inherent to the approach is the collection of data over a wide number of points covering the whole surface or volume scanned and in the latter case the coordinates of the surface itself are directly measured and provide a point cloud representing the surface(s) of interest. In the former case the sampling points form an implicit grid or mesh whereas in the latter case they do not. This means that for the former case the original sampling points may be used as the basis for generating a volume mesh, i.e. do not require re-sampling. The latter type of image data requires an initial volume sampling before applying VOMAC approach. This re-sampling makes use of the information collected over the whole measurement space.

For 2D images, the regular structured mesh may comprise cells that are substantially regular quadrilaterals, e.g. squares. The adjoining cells share a common border. At the corners of each cell the common borders meet at a node. The nodes of the structured mesh form a regular pattern. The mesh generated from the variable distribution of sampling points may have nodes in a non-uniform configuration corresponding to a distorted version of the regular pattern.

For 3D images, the regular structured mesh may comprise cells that are substantially regular hexahedra. Adjoining cells share a common surface. At the vertices of each cell the common surfaces meet at a node. As with the 2D images, the mesh generated from the variable distribution of sampling points may have nodes in a non-uniform configuration corresponding to a distorted version of the regular node pattern of the structured mesh.

The calculation of the variable distribution may be considered as a redistribution of the sampling points of the regular distribution or as a redistribution of the nodes in the regular structured mesh (e.g. if the morphing is confined entirely to the interior area or volume of an imaged object), wherein the redistribution is carried out in a way that preserves the original topology of the sampling points or nodes. No additional nodes or cells are introduced by the redistribution. Redistribution may result in more closely packed nodes in one part of the image data space and, as a direct consequence, more widely spaced nodes in another part of the image data space. It may be desirable to confine the variations in sampling point density to a discrete part of the image data space, i.e. have volumes in which sampling points correspond exactly to the regular distribution.

Since the total number of sampling points in the variable distribution is the same as in the uniform distribution it is inevitable that the variations include a first part with a higher cell density than the uniform distribution and a second part with a lower cell density than the uniform distribution. The variable distribution therefore preferably includes both a part of specific interest, e.g. a focal region around an epicentre, where the sampling points may be moved closer together than in the uniform distribution and a part of lesser importance, e.g. a transition zone, where the sampling points may be spaced further apart than in the uniform distribution.

Calculating the variable distribution may include: designating an epicentre (e.g. focal point) in a region of interest; increasing the density of sampling points in a focal region around the epicentre; and decreasing the density of sampling points in a transition region beyond the focal region. The focal region may be a stable region with uniform cell density.

Variations in sampling point density may be confined to a discrete portion (e.g. a "morphed portion") of the (hypothetical) uniform distribution. That discrete portion may contain both a transition zone and a focal region (e.g. stable zone), and may be surrounded by a region having a uniform distribution which is the same as the (hypothetical) uniform distribution (which region is referred to herein as an infinity zone). The morphing function may thus comprise expressions for each zone, e.g. the stable zone (focal region), transition zone and infinity zone. The location of boundaries between the zones may be set as constraints or determined automatically.

There may be more than one morphed portion in the variable distribution. For example there may be two independent and spatially distant sub-regions of particular interest on the model. The present invention is particularly advantageous in this situation because a part of the model between the sub-regions need not be represented at a higher resolution.

Designating an epicentre or epicentres may include delimiting the focal region or stable zone, i.e. determining or selecting a boundary for the focal region.

The locations of the focal region and transition zone within the sub-region may be based on the geometric complexity in the region of interest. For example, the transition zone may be located in a flat or smooth region of the model.

The focal region and transition zone and the location of sampling points in the variable distribution may be automatically determined by considered one or more factors in addition to the fundamental topological constraint, e.g. by considering any one of: indications inputted manually by a user, localized measures of geometric complexity within regions of interest, computed estimates of locations of significant variation in a field parameter to be subsequently analysed. These factors may be represented in the original image data. For example, in one embodiment, the magnitude (e.g. binary value or the like) of an image signal sampled at a sampling point may be indicative of the material that exists at that point, e.g. bone, tissue, air, etc.

The configuration of cells in the generated mesh may depend on the nature of the volume of interest being modelled. For example, the density of cells in a morphed portion of the mesh (i.e. a portion with a different cell density than the structured mesh which the generated mesh is based on) may vary in a regular fashion from the focal point to the boundary of the morphed portion. In other words the expression for the morphing function in the focal region and the transition zone may be the same. The sampling point density may vary in a substantially linear manner.

Alternatively, the sampling point density may be at a constant (high) value in the stable zone and variation in sampling point density may be confined to the transition zone. The expression of the morphing function in the transition zone may be linear. However, discontinuities at the boundary between the stable zone and the transition zone may cause artefacts in the generated mesh. In one embodiment this problem may be reduced or avoided by providing a non-linear (e.g. quadratic or cubic) function arranged to approach asymptotically the constant value of the stable zone at the boundary.

Generating an indication of the magnitude of cell distortion between the generated mesh and the regular structured mesh may include applying and/or determining the value of a distortion metric for the variable distribution. The distortion metric may be based on the morphing function. The distortion metric may provide an indicator of the magnitude of relative movement between adjacent sampling points in the transformation between the uniform distribution and the variable distribution. Since this reflects how the cell of the mesh are transformed between the regular structured mesh (on which the VOMAC refinement may be performed and which is well suited for finite element analysis) and the final mesh, it provides a relative indication of how well the mesh retains it suitability for finite element (or finite volume) analysis.

The distortion metric may be calculated for each pair of adjacent sampling points. An overall distortion value for the morphing function may be based on the distortion metric output of a "worst element", i.e. the pair of sampling points which yields the greatest distortion.

In one embodiment, the distortion metric may include a calculation or approximation of the ratio of side lengths (or side areas) of each cell in the variable distribution. In another embodiment, the distortion metric may include a calculation or approximation of the ratio between the volumes of the circumscribed sphere and inscribed sphere for each tetrahedralisation of the hexahedral cells in the variable distribution (or the ratio between areas of equivalent circles for a 2D distribution).

The method may include outputting e.g. displaying a value for the distortion metric together with the generated mesh (or displayed model based on the mesh). The morphing function may be altered by changing the constraints or boundary conditions for a mesh. An updated distortion metric may be provided (displayed) for a revised mesh based on the altered morphing function, so a user may see how changing the constraints affects distortion (and hence suitability for finite element (or finite volume analysis).

Alternatively or additionally, a value for the distortion metric, e.g. a value which the "worst element" must not exceed, may be set by a user as a boundary condition against which the locations or boundaries between the stable zone and transition zone, or the sampling point density of the (hypothetical) uniform sampling point distribution may be determined.

The method may include displaying a model based on the generated mesh, e.g. after refinement using VOMAC. Alternatively or additionally the method may including performing a finite element simulation or finite volume simulation using the generated mesh.

Sampling the image data may include obtaining a simplified representation of the data, e.g. by reducing the information content thereof. The simplified representation may be obtained by deriving a value for each data point in the model from a plurality of actual values in the image data. Sampling based on the calculated distribution discussed above may thus include zones of higher and lower sampling rates when compared with a (hypothetical) sampling step which uses the regular sampling point distribution to obtain the structured mesh.

As mentioned above, the image data may be measured information. In such embodiments, the ultimate geometric accuracy of the model may be limited by the resolution of the original image data. However, the image data can still be super-sampled in order to provide a higher mesh density to better model variation of a field parameter of interest. The image data may also be derived from computer generated data, e.g. a CAD drawing or the like, e.g. by extracting discrete data points in the image space that are usable to calculate the data points of the calculated variable distribution.

If the irregularity in the variable distribution is to be confined to a sub-region of the image data space, that sub-region may be selectable by a user, e.g. by manual identification of a focal point with a region of interest. Alternatively, the sub-region may be automatically selected, e.g. using an algorithm arranged to evaluate geometric complexity. The algorithm may thus automatically identify regions that require a higher resolution (cell density) and regions which may be covered effectively at a lower resolution. The algorithm may be arranged to determine the shape of the sub-region according to these considerations. Furthermore, the algorithm may be arranged to determine a sampling rate (for the original image data) within the sub-region.

A further aspect of the invention may include a computer program comprising instructions that, when executed on a processor of a computer, are arranged to perform one or more or all of the steps above. For instance, the instructions can be arranged as modules that execute in the processor (e.g., a sampling module, a mesh-generating module, a uniform sampling point distribution (USPD) morphing module, a variable sampling point distribution (VSPD) morphing module, etc. Another aspect may include a computer program carrier storing the computer program.

An example of a particular use of the invention is where the redistributing of sampling points is used to update the mesh on a model to follow a crack as it propagates throughout a structure. In other words, the particular area of interest is moving through the structure in this example; by moving the morphed portion with the crack it can be modelled more efficiently.

These and other aspects, features and advantages of the invention can be further appreciated from the accompanying Drawing figures and detailed description of certain embodiments, options and preferences.

BRIEF DESCRIPTION OF THE DRAWINGS

An embodiment of the invention is discussed below with reference to the accompanying drawings, in which.

DETAILED DESCRIPTION OF CERTAIN EMBODIMENTS, OPTIONS AND PREFERENCES

The present invention is concerned with generating meshed models from image data to permit finite element (or finite volume) analysis to be performed e.g. by using the cells of the mesh as the primitive units in the analysis. The examples below are based on 3D image data and 3D meshes, but the same principles are applicable to 2D image data and 2D meshes.

The examples illustrated in FIGS. 1-3 are based on a 3D image of the top half of a human femur, taken e.g. using a computerised tomography (CT) scanner or the like. However, the invention may be applied to any type of image data which involves sampling the space in which the object to be imaged resides.

Figure 1A:
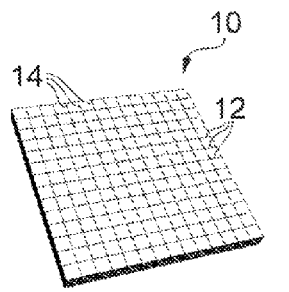
FIGS. 1(a), 1(b) and 1(c) show a uniform sampling distribution, a regular mesh generated therefrom and a close up cross-section through that mesh respectively.

The method of generating a mesh according to the invention involves sampling the image data at a plurality of sampling points. FIG. 1(a) shows one layer (i.e. a cross-section) of a uniform 3D sampling point distribution 10. FIG. 1(a) shows a grid of regularly spaced horizontal lines 12 and vertical lines 14 which intersect with on another. The sampling points are at each intersection. The full 3D uniform distribution is therefore a set of points regularly spaced throughout a 3D Cartesian coordinate system.

The image data may be sampled at each of the sampling points. Based on the results of the sampling, a mesh comprising a plurality of cells whose vertices are defined by the sampling points may be generated. A property for each cell (i.e. whether it is "bone" or "free space" in the example) is assigned based on the results of the sampling at one or more of the vertices which bound that cell. In the Cartesian example of FIG. 1, the cells of the mesh are cubes.

Figure 1B:
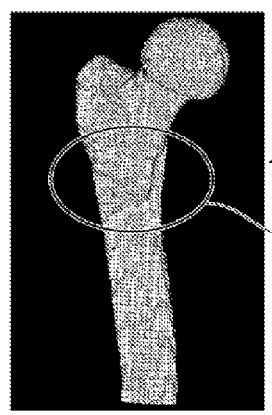

The mesh may then be subjected to refinement techniques (such as the VOMAC method mentioned above) which are arranged to smooth the boundaries between cells of different types (e.g. bone and free space in the example) to reflect more accurately the true surface of the image. The refinement techniques may include constructing surfaces which intersect with (e.g. divide) the cells of the mesh, e.g. splitting the cubes into tetrahedra in the present example. FIG. 1(b) shows a meshed model 16 of the femur that is generated and refined in this way. This meshed model is obtained by conventional methods.

Figure 1C:
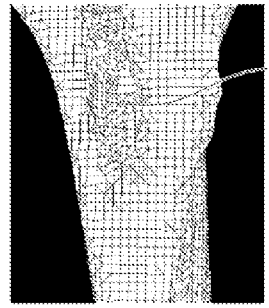

FIG. 1(c) is a close up view of a cross-section through region 18 of the meshed model shown in FIG. 1(b). The cross-section shows that the image data picked up a space (the intramedullary canal) 20 within the imaged volume. The refinement of the mesh can be seen as diagonal lines (which divide cubes into tetrahedra) at the boundaries between bone and free space within the intramedullary canal at the outer surface of the femur. The interior bone volume has no need for refinement and comprises many more untouched cube cells.

The conventional method discussed with respect to FIG. 1 has the drawback that the cells of the mesh have an identical volume throughout the image space, i.e. the mesh has a fixed resolution. This can be disadvantageous if there is a feature of interest which loses significant detail at that resolution. Furthermore, if the cells are for use in performing finite element or volume analysis then this loss of detail may limit the utility of the analysis.

Figure 2A:
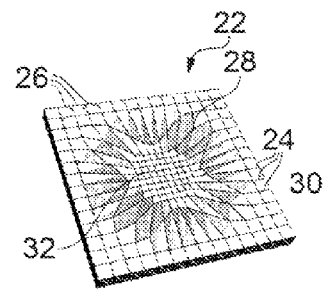
FIGS. 2(a), 2(b) and 2(c) show a variable sampling distribution with high distortion, a mesh generated therefrom and a close up cross-section through that mesh respectively.
Figure 2B:
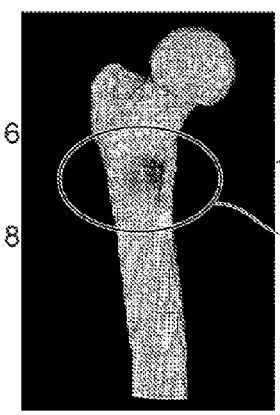
Figure 2C:
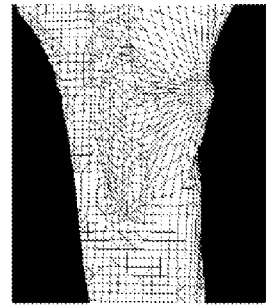

To address this drawback, the invention proposes to vary the density of sampling points in the distribution to provide a concentration of points in a region of interest to preserve detail in that region. FIGS. 2(a), 2(b) and 2(c) show an example where the region of interest includes the lesser trochanter on the femur.

In the invention, the distribution of sampling points with a varying sampling point density ("variable distribution") has the same number and general topology of sampling points as a uniform distribution. There are a number of advantages to this feature, which are explained below. FIG. 2(a) shows one layer of a variable distribution 22 with the same number of sampling points and topology as the distribution 10 shown in FIG. 1(a). The topology is retained because the grid lines 24, 26 joining the sampling points do not cross in FIG. 2(a). The variable distribution 22 has three distinct zones. Around the edge there is an "infinity" zone 28 in which the density of sampling points is the same as the uniform distribution 10 shown in FIG. 1(a). Around the centre of the distribution is a stable zone 32 of sampling points with a higher density than the uniform distribution 10. Between the stable zone 32 and the infinity zone 28 is a transition zone 30 in which the sampling points are spaced further apart to compensate for the closer spacing in the stable zone 32. It can be seen that the cubic cells corresponding to the uniform distribution 10 are distorted in the transition zone 32.

The variable distribution 22 may be obtained by applying a morphing function to the uniform distribution 10. Examples of the morphing function are discussed below with respect to FIGS. 4 and 5.

To generate the mesh, the image data of an actual object is sampled using the variable distribution. It is still desirable to perform mesh refinement to create smooth boundaries. In the invention this is achieved by using the false assumption that the data from the sampling points corresponds to a uniform distribution (similar to FIG. 1(a) and based on that assumption creating a regular intermediate mesh (i.e. with cubic cells similar to FIG. 1(b)) using the data obtained from the non-uniform (variable) sampling. The intermediate mesh thus defines a transformation of the actual object and may therefore bear little resemblance to the image, but it is in the correct format for application of the refinement algorithms in their conventional form. After the intermediate mesh is refined, the same morphing function used to generate the variable distribution from the uniform distribution may be applied to the nodal coordinates of the refined mesh to transform it into a final mesh that correctly represents the true position of the sampling points for the newly formed representation of the physical object. FIG. 2(b) shows a meshed model 34 of the femur which is based on the variable distribution 22 and has been through the transformation step discussed above. It can be seen that the false assumption actually has no effect on the final image, hence that is a useful way to enable conventional refinement algorithms to be applied even when a sampling distribution is non-uniform. However, for it to work it is essential for the non-uniform distribution to retain the topology and sampling point number of a uniform (regular) distribution.

Already in FIG. 2(b) the concentration of cells in the mesh around the lesser trochanter is clear. FIG. 2(c) shows this in more detail by displaying a cross-section of the region 36 around the lesser trochanter. The concentration of cells around the lesser trochanter improves the level of detail in the meshed model compared with the meshed model shown in FIG. 1(c).

However, in the context of performing a finite element or finite volume analysis using meshed models generated in this way, there is a further consideration: distortion of the cells in the meshed. Cells that are too stretched away from the basic structure of a primitive component may cause errors or other artefacts in the analysis. In FIG. 2(a) the rate of change of sampling point density in the transition zone 30 is enormous, and is reflected in some of the extremely distorted cells around the lesser trochanter in FIG. 2(c).

The present invention addresses this additional drawback by providing in the mesh generation method the facility to put a value on the relative magnitude of distortion associated with a certain distribution of sampling points so that a user can compare the level of distortion in different meshed models (i.e. models created from the same image data using different distributions or different morphing functions). Although a relative scale is proposed herein, it may also be possible to using a distortion metric as a constraint when generating a mesh, e.g. for use in deciding the density of the uniform distribution on which the variable distribution is based, or for use is deciding on the relative sizes and locations of the stable zone/transition zone etc.

Figure 3A:
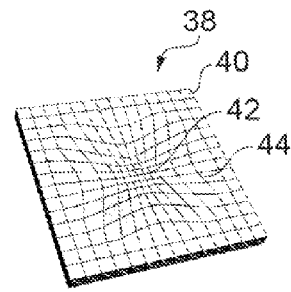
FIGS. 3(a), 3(b) and 3(c) show a variable sampling distribution with low distortion, a mesh generated therefrom and a close up cross-section through that mesh respectively.

FIG. 3(a) shows one layer of a variable distribution 38 with the same number of sampling points and topology as the distribution 10 shown in FIG. 1(a). The topology is retained for the same reasons given above in relation to FIG. 2(a). The variable distribution 38 has the same three zones as in FIG. 2(a). The infinity zone 40 is the same, but the stable zone 42 and transition zone 44 implemented in a way that reduces distortion. In this case this is achieved by reducing the number of sampling points in the stable zone 42 to enable the variation in the transition zone to be spread more smoothly. There are many other ways that this could be achieved, e.g. changing the outer edge of the transition zone 44 or increasing the sampling point density of the uniform distribution. The invention resides in providing a way of quantitatively assessing the effect on distortion that such changes have, e.g. by using a distortion metric, an example of which is discussed below with reference to FIG. 6.

Figure 3B:
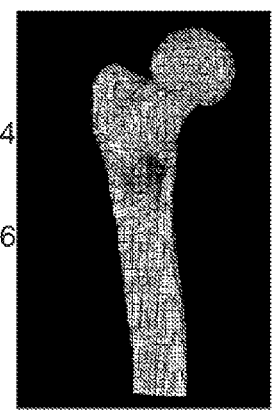
Figure 3C:
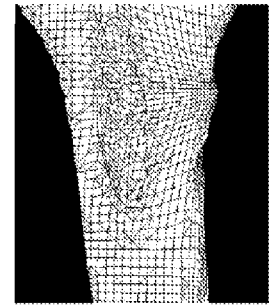

FIGS. 3(b) and 3(c) show a mesh and close up cross-section which correspond to the variable distribution shown in FIG. 3(a) which are generated in the same way as the equivalent structures in FIGS. 2(b) and 2(c). It can be seen in FIG. 3(c) that the cells surrounding the lesser trochanter (i.e. in a volume corresponding to the transition zone 44) are more similar to cubes than cells in the same location in FIG. 2(b). The invention provides a way of quantising that similarity.

The amount of distortion is related to the morphing functions which maps the uniform distribution to the variable distribution (and which is used to transform the intermediate mesh to the final mesh).

Figure 4:
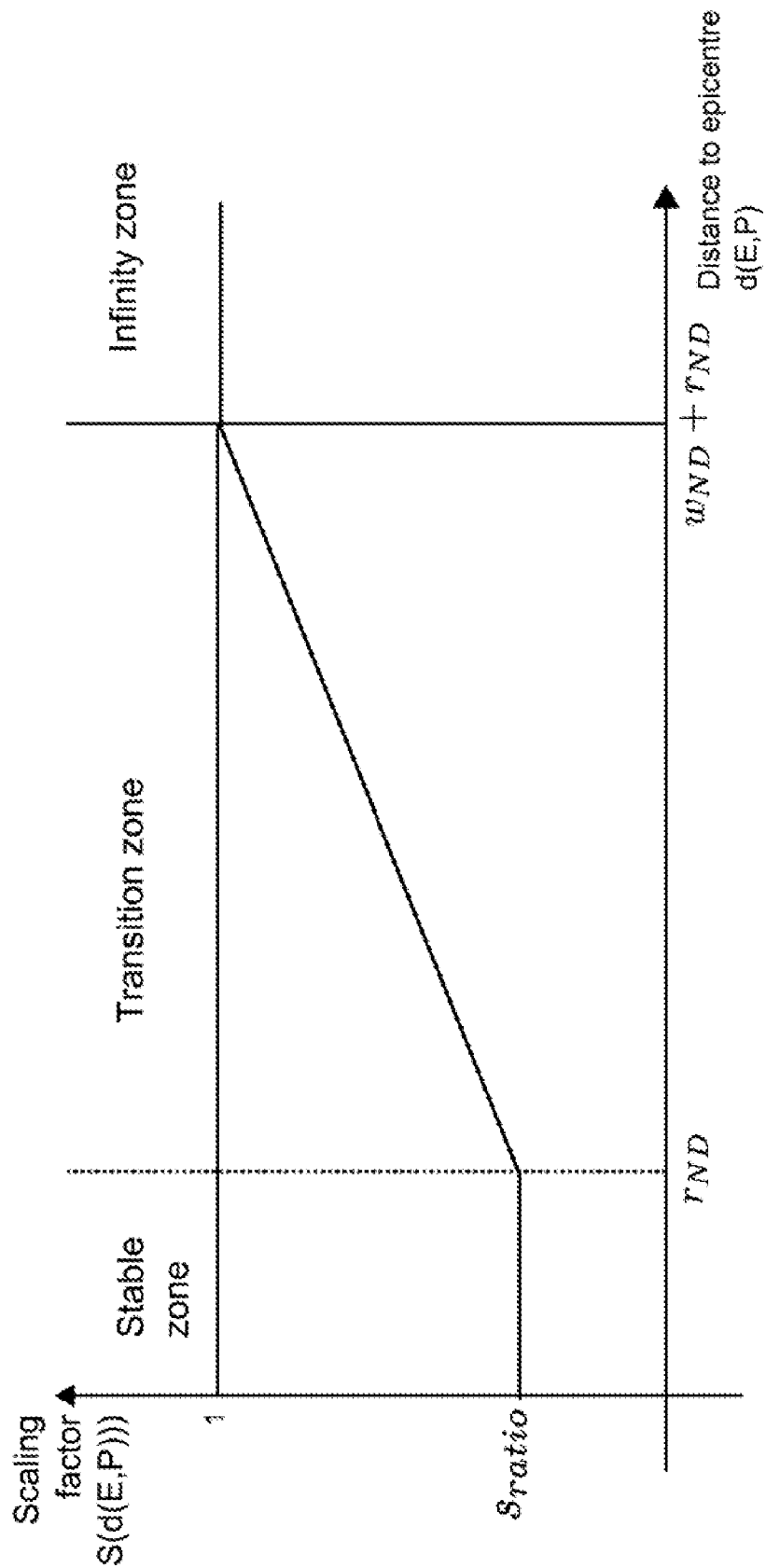
FIG. 4 is a graph showing a linear scaling expression that can be used as a morphing function in the present invention.
Figure 5:
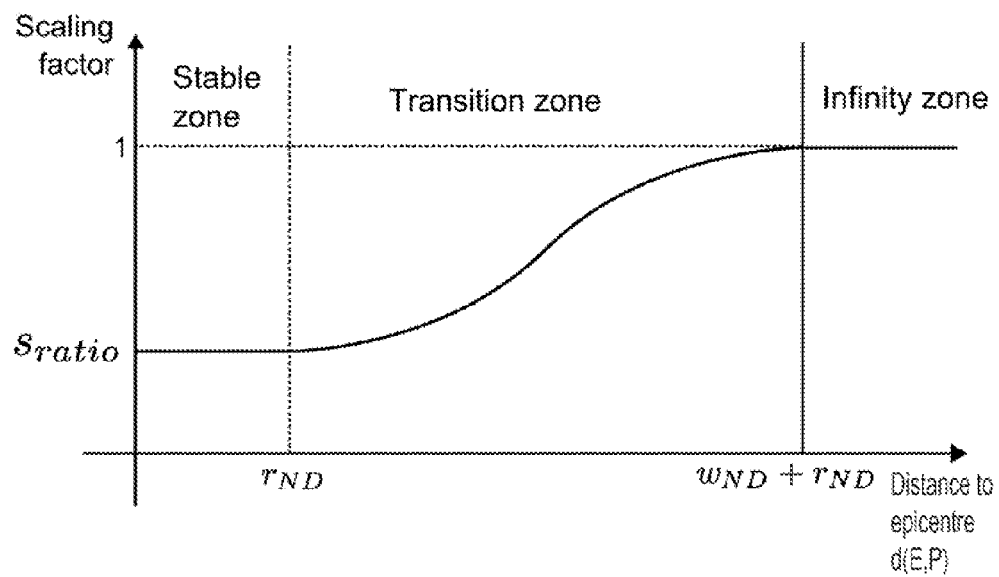
FIG. 5 is a graph showing a non-linear scaling expression that can be used as a morphing function in the present invention.

In one embodiment, the morphing function may operate by mapping a point P to a point P' according to the following relationship:

$$\begin{cases} \overrightarrow{EP'} = S(d(E,P)) \times \overrightarrow{EP} \\ S(d(E,P)) \in \Re^+ \end{cases}$$

where d(E,P) is the distance between an epicentre (focal point) E and P, and S is a scaling function. FIGS. 4 and 5 are two examples of a scaling function. In both examples the stable zone has a constant sampling point density so that scaling function is a constant, $S_{ratio}$. Likewise, the infinity zone has the same sampling point density as the uniform distribution, so the scaling function is unity there. The variation in the two examples is in how the scaling function varies between the two constant values.

In FIG. 4 the scaling is linear in the transition zone, so the scaling function is expressed as:

$$S(d(E,P)) = \begin{cases} S_{ratio} \\ 1 \\ \frac{1-S_{ratio}}{w_{ND}} \times (d(E,P) - r_{ND}) + S_{ratio} \end{cases} \text{ if } \begin{cases} d(E,P) \le r_{ND} \\ r_{ND} + w_{ND} \le d(E,P) \\ \text{otherwise} \end{cases}.$$

In FIG. 5 the scaling function provides smoother transitions between the zones, and is an example of $C^1$ continuity scaling, where the curved section has a tangent that lies on the constant values of the constant values at the boundary points between zones. The scaling function shown in FIG. 5 is expressed as:

$$S(d(E,P)) = \begin{cases} S_{ratio} \\ 1 \\ T(d(E,P)) \end{cases} \text{ if } \begin{cases} d(E,P) \le r_{ND} \\ r_{ND} + w_{ND} \le d(E,P) \\ \text{otherwise} \end{cases}$$

$$T(X) = \alpha X^3 + \beta X^2 + \gamma X + \delta,$$

with α, β, γ and δ such that:

$$\alpha = \frac{2(Y_b - Y_a)}{(X_a - X_b)^3},$$

$$\beta = -\frac{3}{2}\alpha(X_a + X_b),$$

$$\gamma = 3\alpha(X_a \cdot X_b), \text{ and}$$

$$\delta = Y_a - \alpha X_a^3 - \beta X_a^2 - \gamma X_a;$$

and $X_a$, $X_b$, $Y_a$ and $Y_b$ such that:

$X_a = r_{ND}$, $X_b = r_{ND} + w_{ND}$, $Y_a = S_{ratio}$, and $Y_b = 1$.

Of course the present invention need not be limited to the morphing functions described here. In practice the morphing function may be chosen with a view to the context in which the image is present. A user may have control over various parameters of the morphing function, e.g. to set values for $s_{ratio}$, $r_{ND}$ or $w_{ND}$. In addition the user may set the location of the epicentre E.

More generally, the morphing function is implemented in a computer as instructions, such as a USPD morphing function or as a VSPD morphing function, as noted above.

The present invention provides a distortion metric, i.e. a way of measuring how much a mesh (or the sampling distribution that leads to a mesh) is stretched compared with a uniform "parent" mesh or distribution from which the mesh or distribution is arrived at using the morphing function. Since the morphing function is applied to each point, in one embodiment the distortion metric may effectively be a measurement of how each point is moved in compared with its neighbours. In other embodiments, the distortion metric may aim to give a value indicative of the stretch of a cell within the mesh. An 2D example of this is described below with respect to FIG. 6.

Distortion occurs in the transition zone, so the distortion metric may be applied in that zone only. In practice the method of the invention may include applying the distortion metric to each cell in the mesh (or each pair of sampling points in the variable distribution), and extracting and displaying the returned result that indicates the cell or pair having highest level of distortion. Thus, the distortion of a particular morphing function may be characterised by the distortion metric calculating for its "worst element", i.e. most distorted cell or sampling point pairing.

One example of a distortion metric for a pair of sampling points is the following:

$$Q = \frac{\|S(d(E, A)) \times \vec{EA} - S(d(E, B)) \times \vec{EB}\|}{S(d(E, A))},$$

where A and B are two consecutive sampling points on the Cartesian grid which are in the transition zone, i.e.

$$r_{ND} < d(E,A) < r_{ND} + w_{ND}, \text{ and}$$

$$r_{ND} < (E,B) < r_{ND} + w_{ND}.$$

Figure 6:
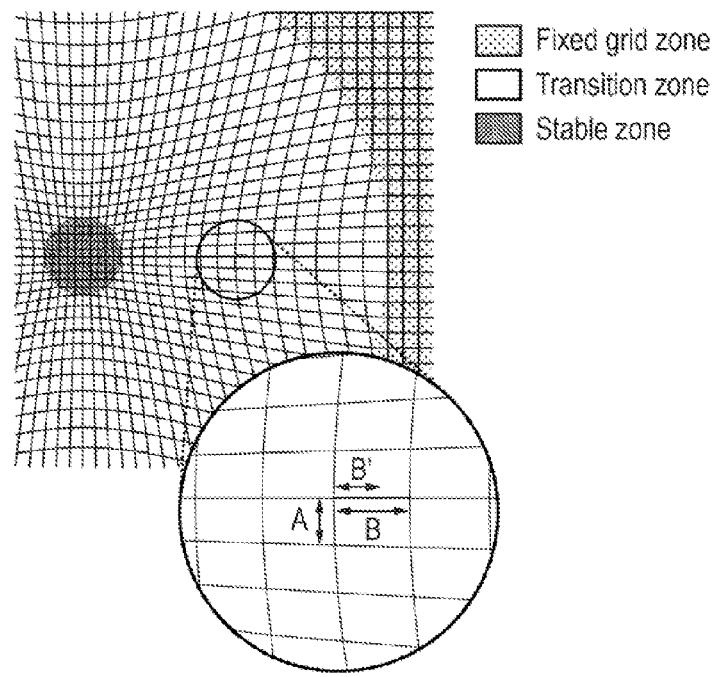
FIG. 6 is a schematic illustration of an example of a distortion metric that can be used with the present invention.

FIG. 6 illustrates schematically the approximate calculation. Q is the ratio between the actual width of an element in the transition zone (i.e. $|\vec{AB}|$ in FIG. 6) and the distance between A and B had the same morphing as A been applied to B (i.e. $|\vec{AB'}|$ in FIG. 6). In practice this is an approximation of the element's edge ratio (i.e. ratio of $|\vec{AB}|$ to $|\vec{AC}|$ in FIG. 6).

Within the computer that implements the above described methodology, are instructions (code) executing in the processor of the computer, as may be provided from medium having computer readable code embodied therein. The medium can be RAM, ROM, a magnetic substrate (e.g., disc, tape, stripe), an optical substrate (e.g., disc), and the like. The code can be arranged as modules operative to perform the functions described herein, or more generally comprise code portions (e.g., first code, second code, etc.) executing in the processor to impart a specific purpose to the host computer when the code is executed.

The invention is not limited to the distortion metrics disclosed above. Any expression may be used that gives a relative indication of the magnitude of stretching of a uniform distribution caused by the morphing function.

The invention claimed is:

1. A computer-implemented method of generating from image data of an actual object a meshed model of the object suitable for finite element or finite volume analysis, the method being implemented on a computer having a processor and comprising:
    calculating a variable distribution of sampling points in image data space using first code executing in the processor, the variable sampling point distribution having localized variations in sampling point density within the image data space;
    sampling the image data of the actual object at the sampling points of the variable sampling point distribution using second code executing in the processor;
    generating a mesh of adjoining cells from the sampled image data using third code executing in the processor; and
    displaying the generated mesh or a model based on the generated mesh on a display,
    wherein the distribution of sampling points has the same topology as a uniform sampling point distribution suitable for obtaining a regular structured mesh, and wherein the method includes generating an indication of the magnitude of cell distortion between the generated mesh and the regular structured mesh.

2. A method according to claim 1, wherein the uniform sampling point distribution is based on either a Cartesian, a cylindrical or a spherical coordinate system.

3. A method according to claim 1, wherein the mesh generating step includes:
    determining and applying a morphing function which transforms a predetermined uniform sampling point distribution into the variable sampling point distribution;
    obtaining a regular structured mesh from the variable sampling point distribution;
    applying marching cubes or volumetric marching cubes techniques to refine the obtained regular structured mesh; and
    applying the morphing function to the refined mesh.

4. A method according to claim 3, wherein the morphing function is a scaling function for mapping each sampling point in a regular sampling point distribution into a point in the variable distribution.

5. A method according to claim 3 including the additional step of selecting the predetermined uniform sampling point distribution.

6. A method according to claim 5, including the additional step of determining a sampling point density for the uniform sampling point distribution.

7. A method according to claim 4, wherein the scaling function is determined based on information about the image data, and/or constraints or boundary conditions input by a user.

8. A method according to claim 1, wherein calculating the variable sampling point distribution includes:
    designating an epicentre in the image data space;
    increasing the density of sampling points in a focal region around the focal point; and
    decreasing the density of sampling points in a transition zone beyond the focal region.

9. A method according to claim 8, wherein the focal region and transition zone are confined within a sub-region of the image data space.

10. A method according to claim 9 including the additional step of delimiting the sub-region.

11. A method according to claim 9, wherein the sampling point density outside the sub-region is the same as the uniform sampling point distribution.

12. A method according to claim 9, wherein the locations of the focal region and transition zone are based on geometric complexity in the image data space.

13. A method according to claim 8, including the additional step of automatically determining the focal region and transition zone and the location of redistributed sampling points therein by considering any of:
- indications inputted manually by a user,
- localized measures of geometric complexity within regions of interest,
- variations in signal strength reflecting changes in material properties, and
- computed estimates of locations of significant variation in a field parameter to be subsequently analysed.

14. A method according to claim 8, wherein the sampling point density is constant in the focal region.

15. A method according to claim 1, wherein generating an indication of the magnitude of cell distortion between the generated mesh and the regular structured mesh includes determining the value of a distortion metric for the variable distribution.

16. A method according to claim 3, wherein a distortion metric is based on the morphing function.

17. A method according to claim 15, wherein the distortion metric provides an indicator of the magnitude of relative movement between adjacent sampling points in the transformation between the uniform distribution and the variable distribution.

18. A method according to claim 15, including the additional step of outputting a value for the distortion metric.

19. A method according to claim 18, wherein the output value is the distortion metric value for the element that is most distorted by the morphing function.

20. A method according to claim 1, including the additional step of displaying a model based on the generated mesh.

21. A method according to claim 1, including the additional step of performing finite element analysis or finite volume analysis using the generated mesh.

22. A computer program product, comprising a non-transitory computer usable medium having a computer readable program code embodied therein, said computer readable program code adapted to be executed to implement a method for generating a from image data a meshed model suitable for finite element or finite volume analysis, said method comprising:
- calculating a variable distribution of sampling points in image data space using first code executing in the processor, the variable sampling point distribution having localized variations in sampling point density within the image data space;
- sampling the image data of the actual object at the sampling points of the variable sampling point distribution using second code executing in the processor;
- generating a mesh of adjoining cells from the sampled image data using third code executing in the processor; and
- displaying the generated mesh or a model based on the generated mesh on a display,
wherein the distribution of sampling points has the same topology as a uniform sampling point distribution suitable for obtaining a regular structured mesh, and wherein the method includes generating an indication of the magnitude of cell distortion between the generated mesh and the regular structured mesh.

* * * * *